United States Patent
Lee

(10) Patent No.: US 7,358,685 B2
(45) Date of Patent: Apr. 15, 2008

(54) DC-DC CONVERTER HAVING PROTECTIVE FUNCTION OF OVER-VOLTAGE AND OVER-CURRENT AND LED DRIVING CIRCUIT USING THE SAME

(75) Inventor: Sang Yun Lee, Kyungki-do (KR)

(73) Assignee: Samsung Electro-Mechanics Co., Ltd., Kyundi-Do (KR)

( * ) Notice: Subject to any disclaimer, the term of this patent is extended or adjusted under 35 U.S.C. 154(b) by 77 days.

(21) Appl. No.: 11/435,752

(22) Filed: May 18, 2006

(65) Prior Publication Data

US 2006/0261752 A1    Nov. 23, 2006

(30) Foreign Application Priority Data

May 18, 2005   (KR)   .................. 10-2005-0041525

(51) Int. Cl.
  *H05B 41/24* (2006.01)
  *H05B 39/04* (2006.01)
  *H01J 1/60* (2006.01)

(52) U.S. Cl. .............. 315/287; 315/129; 315/299; 315/320

(58) Field of Classification Search .............. 315/129, 315/130, 136, 246, 287, 291, 299, 312, 320, 315/324, 362
See application file for complete search history.

(56) References Cited

U.S. PATENT DOCUMENTS 5,675,485 A * 10/1997 Seong .................. 363/97
5,862,044 A *  1/1999 Shioya et al. ........ 363/21.07
6,487,059 B2* 11/2002 Bontempo et al. ....... 361/90

* cited by examiner

Primary Examiner—Thuy Vinh Tran
(74) Attorney, Agent, or Firm—McDermott Will & Emery LLP

(57) ABSTRACT

The invention relates to a DC-DC converter having over-current/over-voltage protection function and an LED driving circuit using the same. The DC-DC converter adjusts a width of a switching pulse outputted from a Pulse Width Modulation (PWM) controller to control on/off durations of a switch, thereby providing a controlled level of voltage to a load. The DC-DC converter includes a microcontroller for detecting a voltage, and if the detected voltage is greater than a reference voltage, generating an alarm signal. The DC-DC converter further includes a digital-analogue converter for outputting a voltage of 0V and an analogue dimmer for generating a control signal that changes an 'on' duration of the switching pulse outputted from the PWM controller to 0 and providing the control signal to the PWM controller.

7 Claims, 5 Drawing Sheets

(a)

(b)

US 7,358,685 B2

DC-DC CONVERTER HAVING PROTECTIVE FUNCTION OF OVER-VOLTAGE AND OVER-CURRENT AND LED DRIVING CIRCUIT USING THE SAME

CLAIM OF PRIORITY

This application claims the benefit of Korean Patent Application No. 2005-41525 filed on May 18, 2005, in the Korean Intellectual Property Office, the disclosure of which is incorporated herein by reference.

BACKGROUND OF THE INVENTION

1. Field of the Invention

The present invention relates to a DC-DC converter and a light emitting diode (LED) driving circuit using the same. More particularly, the invention relates to a Pulse Width Modulation (hereinafter referred to as PWM) based DC-DC converter, which immediately blocks over-current or over-voltage due to short-circuit or disconnection from being applied to the DC-DC converter in order to protect a circuit, and an LED driving circuit using the same.

2. Description of the Related Art

In general, a Cold Cathode Fluorescent Lamp (CCFL, hereinafter referred to as CCFL) used for a light source of a Liquid Crystal Display (LCD, hereinafter referred to as LCD) uses mercury gas. Thus it has drawbacks in that it is prone to environmental pollution, has a slow response rate, has low color reproducibility and is not appropriate for miniaturization of an LCD panel.

On the other hand, a Light Emitting Diode (LED, hereinafter referred to as LED) has merits in that it is environmentally friendly, has a prompt response rate in nanoseconds, which is effective for a video signal stream, is possible in impulsive driving and has color reproducibility of over 100%. Further, not only the amount of light of red, green and blue LEDs can be adjusted to change luminance and color temperature, but also the LED is appropriate for miniaturization of an LCD panel. Thus, recently, the LED has been actively adopted as a light source for a backlight such as an LCD panel.

In case of using a plurality of LEDs connected in series in a LCD backlight, a driving circuit is needed to provide a controlled level of constant current to the LED. A PWM based DC-DC converter is typically used for a circuit to drive an LED with constant current. FIGS. 1(a) and (b) illustrate a conventional PWM based DC-DC converter.

First, FIG. 1(a) is a circuit diagram illustrating an example of a conventional LED driving circuit using a buck DC-DC converter. As shown in FIG. 1(a), in the conventional buck DC-DC converter, an inductor L is connected in series with an LED array 11 at a positive end of a direct current Vin, and a diode D is connected in parallel with the inductor L and the LED array. In addition, a switch 12 and a voltage detection resistor Rs is connected in series at a negative end of a connection node of the diode D and a negative end of the direct current Vin. The voltage value detected by the voltage detection resistor Rs is inputted to a PWM controller 13, which adjusts an on/off duty ratio of the switch according to the detected voltage value. The switch 12 can be a metal oxide semiconductor field-effect transistor (MOSFET) as shown in FIG. 1, which can be used as a switch by adjusting a gate voltage thereof.

When the switch 12 is 'on', the current supplied from the direct current Vin is transmitted to the LED array 11 via the inductor L. At this point, energy is accumulated in the inductor L. When the switch 12 is 'off', power is supplied to the LED array by the energy accumulated in the inductor L. The PWM controller 13 adjusts an on/off duty ratio of the switch 12 according to a resistance value of the voltage detection resistor Rs.

In an LED driving circuit using such a buck DC-DC converter, when both ends of the LED array 11 are short-circuited due to abnormality in the external environment of the circuit or in the driving circuit itself, over-current may run on the circuit, damaging the diode D and the switch 12. The LED included in the LED array 11 can also be damaged by the over-current if it exceeds the rated current of the LED array 11. Furthermore, the accumulated current may flow from Switch Mode Power Supply (SMPS), which supplies the direct current Vin, to the driving circuit, causing a more serious problem.

FIG. 1(b) is a circuit diagram illustrating an example of an LED driving circuit adopting a conventional boost DC-DC converter. As shown in FIG. 1(b), in the conventional boost DC-DC converter, an inductor L and a diode D are connected in series at a positive end of a direct current Vin, and a capacitor C and an LED array 11 are connected in parallel between the diode D and the direct current Vin. A switch 12 and a voltage detection resistor Rs are connected in series between a connection node of the inductor L and the diode D and a negative end of the direct current Vih. A voltage value detected by the voltage detection resistor Rs is inputted into a PWM controller 13, which adjusts an on/off duty ratio of the switch according to the detected voltage value. As shown in FIG. 1(b), the switch 12 can be a MOSFET, which can be used as a switch by adjusting a gate voltage thereof.

When the switch is 'on', the current supplied from the direct current Vin runs through the inductor L and the switch S, and energy is stored in the inductor L. When the switch 12 is 'off', the sum of the energy accumulated in the direct current Vin and that in the inductor L is passed through the diode D and transmitted to the LED array. Here, the voltage is smoothed by a smoothing capacitor C before being transmitted to the LED array 11, and the value of the voltage is equal to or greater than an input voltage Vin.

In an LED driving circuit using such a boost DC-DC converter, if at least one of the LEDs of the LED array 11 is disconnected, the current does not run on the LED array 11. Thus, due to counter electromotive force of the inductor, both ends of the LED array 11 are applied with a voltage several times higher than the inductor voltage during a normal operation and the input voltage, resulting damage to the device by over-voltage.

Therefore, there has been a need for a DC-DC converter circuit having an over-voltage or over-current protection function, preventing damage to the device due to over-current or over-voltage generated when an LED (a load) is shorted or disconnected.

SUMMARY OF THE INVENTION

The present invention has been made to solve the foregoing problems of the prior art and it is therefore an object of the present invention to provide a DC-DC converter which detects over-current and over-voltage due to disconnection or short circuit of a load to halt the operation of a circuit in advance, thereby preventing damage to the circuit.

It is another object of the invention to provide an LED driving circuit adopting the above DC-DC converter.

According to an aspect of the invention for realizing the object, there is provided a DC-DC converter for adjusting a width of a switching pulse outputted from a Pulse Width Modulation (PWM) controller to control on/off durations of a switch, thereby providing a controlled level of voltage to a load. The DC-DC converter includes: a microcontroller for detecting a voltage at an end of the load, and if the detected voltage is greater than a predetermined reference voltage, generating an alarm signal; a digital-analogue converter for receiving the alarm signal to output a voltage of 0V; and an analogue dimmer for receiving the voltage of 0V from the digital-analogue converter to generate a control signal that changes an 'on' duration of the switching pulse outputted from the PWM controller to 0 and providing the control signal to the PWM controller.

According to an embodiment of the present invention, it is preferable that the microcontroller detects a voltage at a current output end of the load if the DC-DC converter is a buck DC-DC converter.

According to another embodiment of the present invention, it is preferable that the microcontroller detects a voltage at a current input end of the load if the DC-DC converter is a boost DC-DC converter.

In case of adapting the present invention to a circuit for driving an LED, the load comprises an LED array having an LED or at least two LEDs connected in series.

According to another aspect of the invention for realizing the object, there is provided an LED driving circuit including:

a first DC-DC converter for adjusting a width of a switching pulse outputted from a first Pulse Width Modulation (PWM) controller to control on/off durations of a first switch, thereby providing a predetermined level of voltage to a red LED array having at least two red LEDs connected in series;

a second DC-DC converter for adjusting a width of a switching pulse outputted from a second PWM controller to control on/off durations of a second switch, thereby providing a predetermined level of voltage to a blue LED array having at least two blue LEDs connected in series;

a third DC-DC converter for adjusting a width of a switching pulse outputted from a third PWM controller to control on/off durations of a third switch, thereby providing a predetermined level of voltage to a green LED array having at least two green LEDs connected in series;

a microcontroller for detecting a voltage from each of the red, blue, and green LED arrays, and if the detected voltage is greater than a predetermined voltage, generating an alarm signal indicating abnormality in a corresponding LED array;

a digital-analogue converter for receiving the alarm signal and outputting a voltage of 0V for a corresponding DC-DC converter with the abnormality; and first to third analogue dimmers each connected to each of the first to third PWM controllers, the analogue dimmers adapted to generate a control signal that changes the 'on' duration of the switching pulse outputted from the PWM controller to 0 and provide the control signal to the connected PWM controllers if the voltage of 0V is received from the digital-analogue converter.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
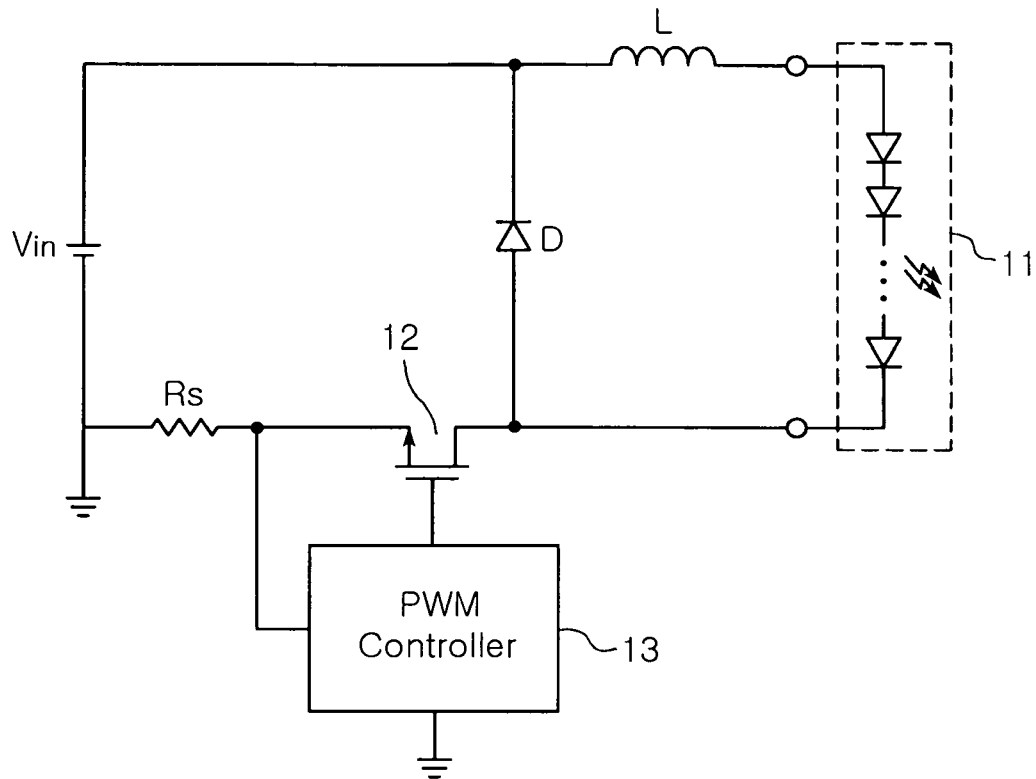
FIG. 1(a) is a circuit diagram illustrating an LED driving circuit using a conventional buck DC-DC converter.
FIG. 1(b) is a circuit diagram illustrating an example of an LED driving circuit using a conventional boost DC-DC converter.
Figure 1:
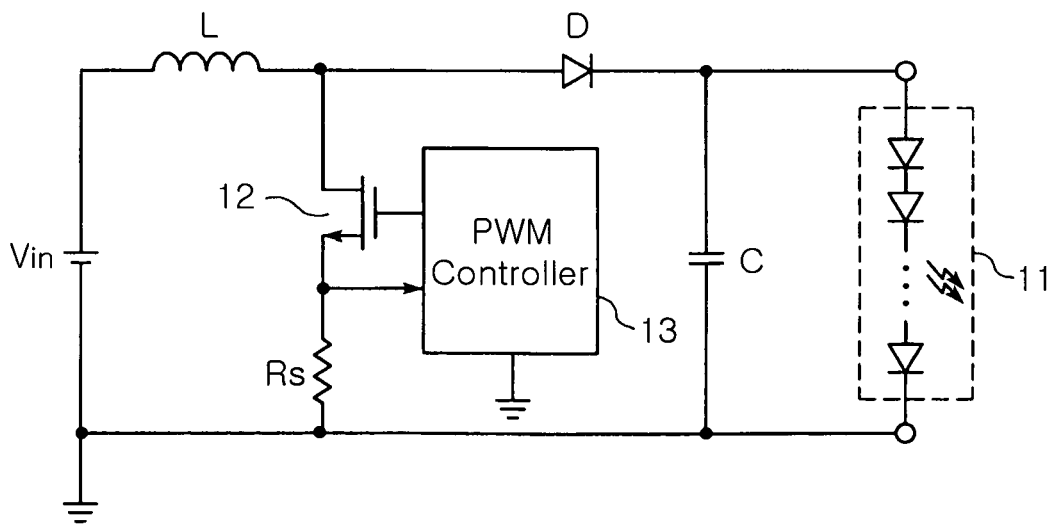

Preferred embodiments of the present invention will now be described in detail with reference to the accompanying drawings. It is intended, however, that unless particularly specified, dimensions, materials, relative positions and so forth of the constituent parts in the embodiments shall be interpreted as illustrative only not as limitative of the scope of the present invention. These embodiments are provided so that this disclosure will be thorough and complete, and will fully convey the scope of the invention to those skilled in the art. In the drawings, the shapes and dimensions are exaggerated for clarity, and the same reference numerals are used throughout to designate the same or similar components.

Figure 2:
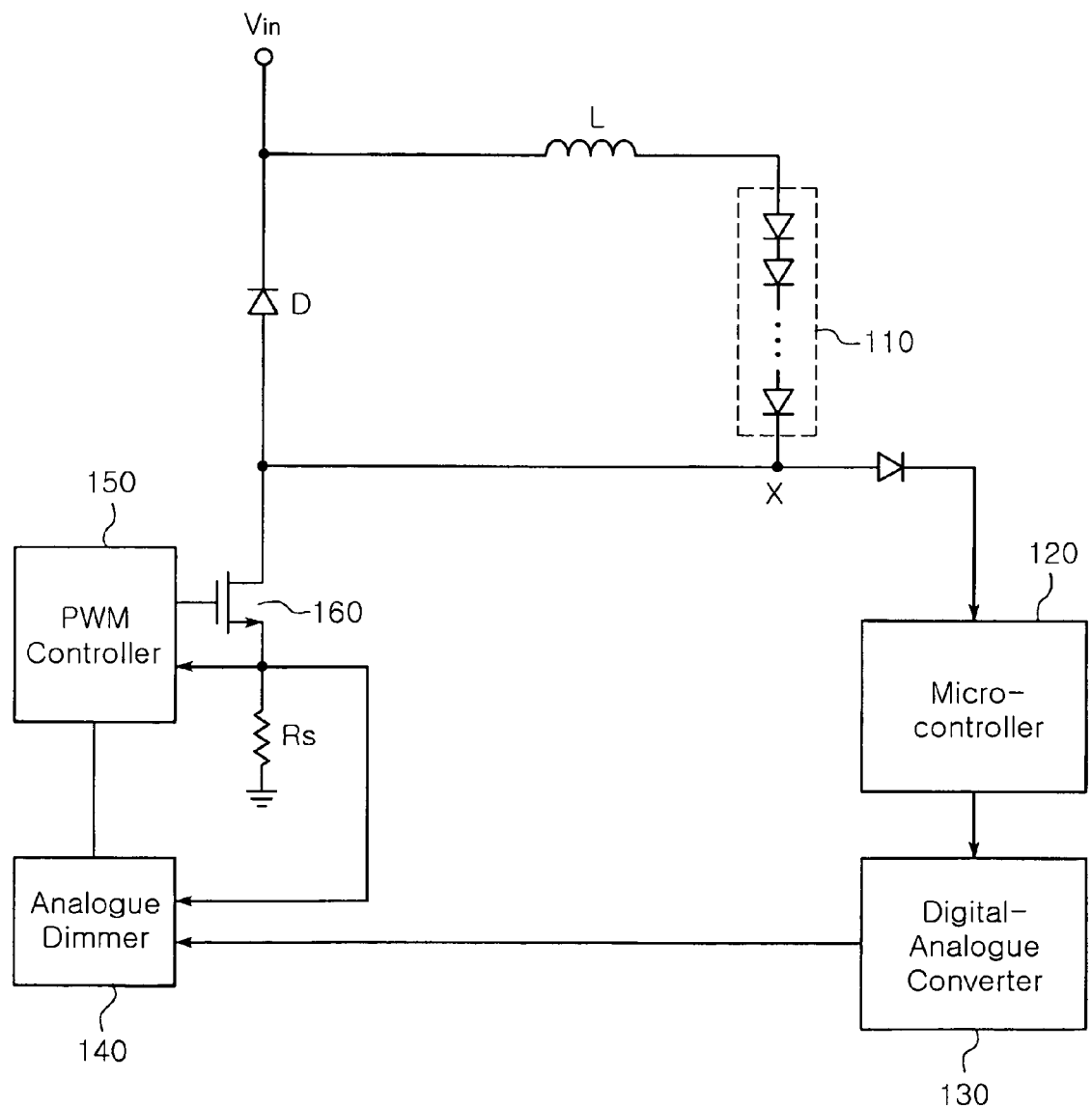
FIG. 2 is a circuit diagram illustrating a DC-DC converter according to an embodiment of the present invention.

FIG. 2 is a circuit diagram illustrating a DC-DC converter according to an embodiment of the present invention. The DC-DC converter illustrated in FIG. 2 is an example of a buck DC-DC converter. Referring to FIG. 2, the DC-DC converter according to an embodiment of the present invention adjusts a width of a switching pulse outputted from a PWM controller 150 to control on/off durations of a switch 160, thereby providing a controlled level of voltage to a load 110. The DC-DC converter according to the present invention includes a microcontroller 120. The microcontroller 120 detects a voltage from a current output end X of the load 110, and if the detected voltage is higher than a predetermined reference voltage, generates an alarm signal indicating abnormality. The DC-DC converter further includes a digital-analogue converter 130 for receiving the alarm signal and outputting a voltage of 0V; and an analogue dimmer 140 for receiving the voltage of 0V from the digital-analogue converter 130 to generate a control signal that changes the 'on' duration of the switching pulse outputted from the PWM controller 150 to 0 and providing the control signal to the PWM controller.

As explained in the prior art, a buck DC-DC converter has a problem that the circuit is damaged by over-current when the load is short-circuited. Therefore, in a buck DC-DC converter, the microcontroller 120 detects a voltage from a current output end X of the load. A DC-DC converter according to the present invention can be advantageously adopted in an LED driving circuit, in which the load can be an LED array having one or more LEDs connected in series. When an LED or an LED array is used as a load, a voltage is detected at a cathode of the LED or the LED array. When the load is short-circuited in such a buck DC-DC converter, the voltage detected at the current output end X can be increased to the level of an input voltage Vin. The microcontroller 120 compares the detected voltage with a predetermined reference voltage, in accordance with a driving program stored in a memory (not shown) inside thereof, and if the detected voltage is greater than the reference voltage, generates an alarm signal indicating abnormality.

The digital-analogue converter 130 receives the alarm signal generated by the microcontroller 120 to output a voltage of 0V.

The analogue dimmer 140 receives the voltage of 0V from the digital-analogue converter 130 to generate a control signal which changes the 'on' duration of the switching pulse outputted from the PWM controller 150 to 0 and provides the control signal to the PWM controller 150. Typically, the PWM controller 150 is manufactured in various types of ICs with a plurality of input and output terminals. The PWM controller 150 can adopt various types of input and output terminals to adjust the 'on' duration of the switching pulse outputted from the PWM controller 150 to 0. For example, in a PWM IC, the control signal can be inputted to a PWM IC COMP terminal and a Vref terminal and a RT/CT terminal can be grounded to change the 'on' duration of the switching pulse to 0. The input and output terminals can be utilized in other ways to adjust the switching pulse to 0 regardless of the types of PWM IC. Thus, the 'on' duration of the switching pulse outputted from the PWM controller 150 can be adjusted to 0 in various ways depending on the configuration of PWM IC. The present invention includes any control signal that is capable of changing the 'on' duration of the switching pulse of the PWM controller to 0.

When the 'on' duration of the switching pulse outputted from the PWM controller 150 is changed to 0, the switch is kept 'off' and the current no longer runs to the load 110. This solves the problem of over-current due to disconnection of the load in a buck DC-DC converter.

Figure 3:
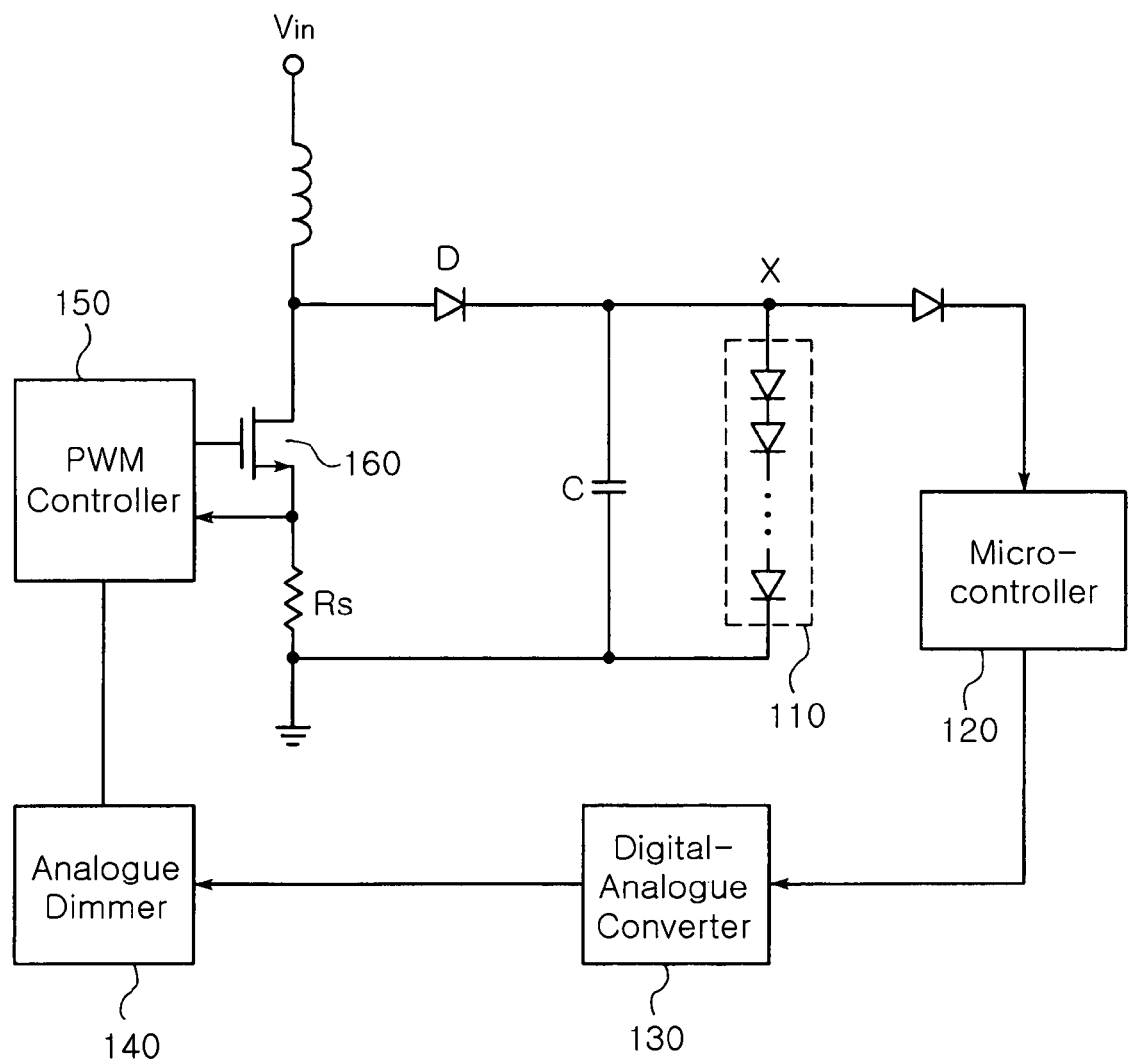
FIG. 3 is a circuit diagram illustrating a DC-DC converter according to another embodiment of the present invention.

FIG. 3 is a circuit diagram illustrating a DC-DC converter according to another embodiment of the present invention. The DC-DC converter illustrated in FIG. 3 is an example of a boost DC-DC converter. As explained in the prior art, a boost DC-DC converter has a problem that disconnection of the load results in damage to the circuit due to over-current. Therefore, in a boost DC-DC converter, the microcontroller 120 detects a voltage at a current input end X of the load. The DC-DC converter according to the present invention can be advantageously adopted in an LED driving circuit, in which the load can be an LED array consisting of one or more LEDs connected in series. When an LED or an LED array is used as a load, the voltage is detected at an LED or an anode of an LED array. In such a boost DC-DC converter, when the load is disconnected, the voltage detected from the current input end X is a high level of voltage which is a sum of a voltage several times higher than the inductor voltage during a normal operation and the input voltage Vin. The microcontroller 120 compares the detected voltage with a predetermined reference voltage in accordance with a driving program stored in a memory (not shown), and if the detected voltage is greater than the reference voltage, generates an alarm signal indicating abnormality. The digital-analogue converter 130 receives the alarm signal generated by the microcontroller 120 and output a voltage of 0. Since the alarm signal transmitted from the microcontroller 120 is a digital signal, the digital-analogue converter 130 outputs the alarm signal as an analogue signal (0V) applicable to an analogue circuit.

The analogue dimmer 140 receives a voltage of 0V from the digital-analogue converter 130 to generate a control signal for changing the 'on' duration of the switching pulse outputted from the PWM controller 150 and provides the control signal to the PWM controller 150.

When the 'on' duration of the switching pulse outputted from the PWM controller 150 is changed to 0 by the control signal provided by the analogue dimmer 140, the switch 160 is kept 'off', and only the input voltage is continuously provided to the load 110, preventing damage to the circuit due to over-voltage.

Figure 4:
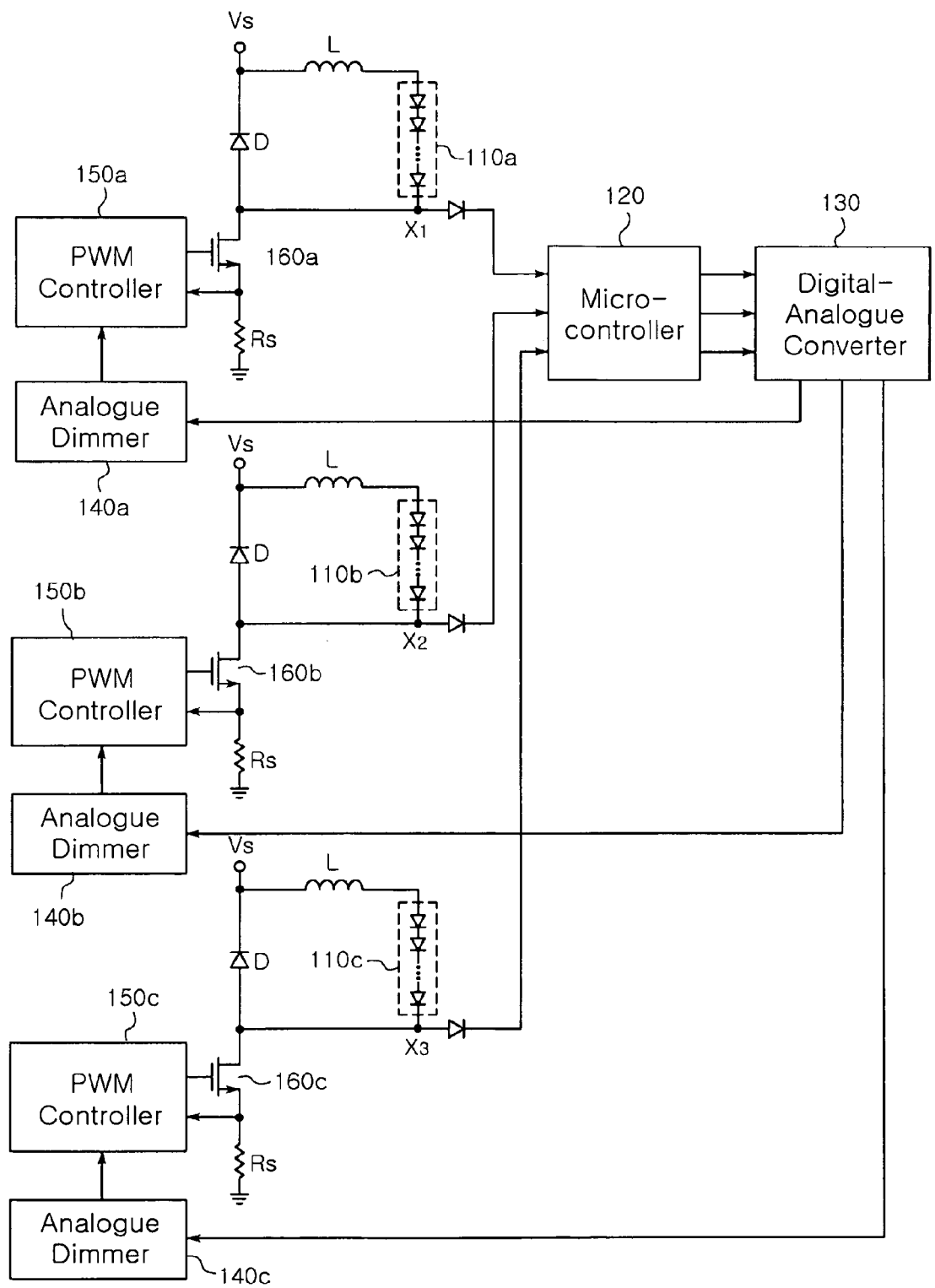
FIG. 4 is a circuit diagram illustrating an LED driving circuit according to an embodiment of the present invention.

FIG. 4 is a circuit diagram illustrating an LED driving circuit according to an embodiment of the present invention. In general, when an LED is applied to the backlight of an LCD, a plurality of LEDs generating red, blue, and green lights are used in order to generate white light. As shown in FIG. 4, each of the red, blue and green LEDs may adopt a form of LED array 110a, 110b, 110c having two or more LEDs connected in series. Each of the LED arrays 110a, 110b and 110c are supplied with power via the DC-DC converter.

The LED driving circuit according to an embodiment of the present invention includes first to third DC-DC converters. The first DC-DC converter adjusts a width of a switching pulse outputted from a first PWM controller 150a to control on/off durations of a first switch 160a, thereby providing a controlled level of voltage to a red LED array 110a having at least two red LEDs connected in series. The second DC-DC converter is adapted to adjust a width of a switching pulse outputted from a second PWM controller 150b to control on/off durations, thereby providing a predetermined level of voltage to a blue LED array 110b at least two blue LEDs connected in series. The third DC-DC converter is adapted to adjust a width of a switching pulse outputted from a third PWM controller 150c to control on/off durations of a third switch 160c, thereby providing a predetermined level of voltage to a green LED array 110c having at least two green LEDs connected in series. The LED driving circuit further includes a microcontroller 120 and a digital-analogue converter 130. The micro controller 120 is adapted to detect a voltage from each of cathodes X1, X2, and X3 of the red LED array 110a, the blue LED array 110b, and the green LED array 110c, and if each of the detected voltages is greater than a predetermined reference voltage, generate an alarm signal indicating abnormality in the corresponding LED array. The digital-analogue converter 130 receives the alarm signal and outputting a voltage of 0V for a corresponding DC-DC converter having the abnormality. The LED driving circuit further includes first to third analogue dimmers 140a, 140b, and 140c each connected to the first to third PWM controllers 150a, 150b, and 150c, respectively. The analogue dimmers 140a, 140b, and 140c are adapted to generate a control signal for changing the 'on' duration of the switching pulse outputted from the PWM controller to 0 if a voltage of 0V is received from the digital-analogue converter 130 and provide the control signal to the connected PWM controller.

This embodiment adopts a buck DC-DC converter, and thus the microcontroller 120 detects a voltage from each of the cathodes of the red LED array 110a, the blue LED array 110b, and the green LED array 110c. The microcontroller 120 compares the voltage detected from each of the cathodes of the LED arrays with a predetermined reference voltage, and if the detected voltage is greater than the predetermined voltage, generates an alarm signal indicating abnormality in a corresponding LED array.

The digital-analogue converter 130 receives the alarm signal and generates a voltage of 0V for the LED array having abnormality.

The first to third analogue dimmers 140a, 140b, and 140c are connected to the first to third PWM controllers, respectively. When the digital-analogue converter 130 generates the voltage of 0V for the corresponding LED array, each of the analogue dimmers 140a, 140b and 140c receives the voltage of 0 and generates a control signal for changing the 'on' duration of the switching pulse outputted from the connected PWM controller to 0, and provides the control signal to the connected PWM controllers.

For example, if a red LED array 110a and a blue LED array 110b are normally operating while a green LED array is shorted, the microcontroller 120 generates an alarm signal for the green LED array 110c, and the digital-analogue converter 130 receives the alarm signal for the green LED array and outputs a voltage of 0 to a third analogue dimmer 140c connected to a third PWM controller 150c. The third analogue dimmer 140c generates a control signal for changing an 'on' duration of a switching pulse outputted from the third PWM controller 150c and provides the control signal to the third PWM controller 150c. The third PWM controller 150c changes the 'on' duration of the switching pulse to 0 to keep a third switch 'off'. Thereby, the current supplied to the shorted green LED array 110c is blocked to prevent damage to the circuit due to over-current.

Figure 5:
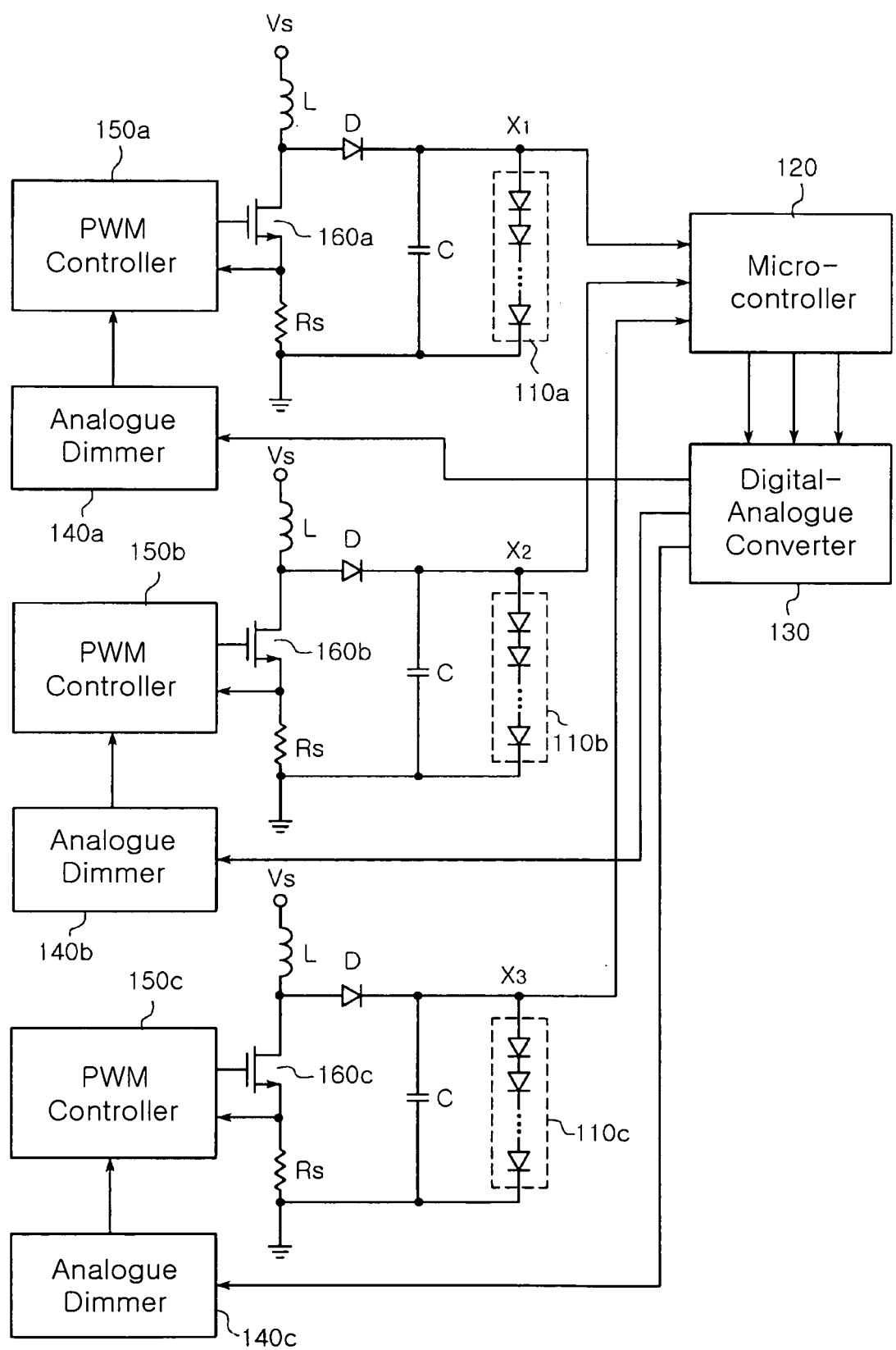
FIG. 5 is a circuit diagram illustrating an LED driving circuit according to another embodiment of the present invention.

FIG. 5 is a circuit diagram of an LED driving circuit according to another embodiment of the present invention, illustrating an example of a boost DC-DC converter. As shown in FIG. 5, the LED driving circuit adopts a boost DC-DC converter in this embodiment, and thus the microcontroller 120 detects voltages of anodes X1, X2 and X3 of LED arrays 110a, 110b and 110c. Each of the voltages detected at the anodes X1, X2 and X3 of the LED arrays 110a, 110b and 110c is compared with a predetermined reference voltage. If the detected voltage is greater than the predetermined reference voltage, the microcontroller 120 generates an alarm signal indicating abnormality in a corresponding LED array.

The digital-analogue converter 130 receives the alarm signal to generate a voltage of 0V for the LED array with the abnormality.

The first to third analogue dimmers 140a, 140b, and 140c are connected to the first to third PWM controllers, respectively. When the digital-analogue converter 130 generates the voltage of 0V, each of the analogue dimmers 140a, 140b and 140c receives the voltage of 0 for the corresponding LED array and generates a control signal for changing the 'on' duration of the switching pulse outputted from the connected PWM controller, and provides the control signal to the connected PWM controller. Each of the PWM controllers receiving the control signals from each of the first to third analogue dimmers 140a, 140b and 140c maintains the 'on' duration of the switching pulse applied to the switche at 0, preventing damage to the DC-DC converter having the disconnected LED array.

As described above, the present invention can prevent the circuit from over-current and over-voltage that may be produced when the load (the LED array) connected to the DC-DC converter is shorted or disconnected by external environment.

In the present invention set forth above, in a PWM-based DC-DC converter, over-current or over-voltage applied to a DC-DC converter due to a shorted or disconnected load is quickly blocked, thereby preventing damage to a circuit.

While the present invention has been shown and described in connection with the preferred embodiments, it will be apparent to those skilled in the art that modifications and variations can be made without departing from the spirit and scope of the invention as defined by the appended claims.

What is claimed is:

1. A DC-DC converter for adjusting a width of a switching pulse-outputted from a Pulse Width Modulation (PWM) controller to control on/off durations of a switch, thereby providing a controlled level of voltage to a load, comprising:
   a microcontroller for detecting a voltage at an end of the load, and if the detected voltage is greater than a predetermined reference voltage, generating an alarm signal;
   a digital-analogue converter for receiving the alarm signal to output a voltage of 0V; and
   an analogue dimmer for receiving the voltage of 0V from the digital-analogue converter to generate a control signal that changes an 'on' duration of the switching pulse outputted from the PWM controller to 0 and providing the control signal to the PWM controller.

2. The DC-DC converter according to claim 1, wherein if the DC-DC converter is a buck DC-DC converter, the microcontroller detects a voltage at a current output end of the load.

3. The DC-DC converter according to claim 1, wherein if the DC-DC converter is a boost DC-DC converter, the microcontroller detects a voltage at a current input end of the load.

4. The DC-DC converter according to claim 1, wherein the load comprises an LED array having an LED or at least two LEDs connected in series.

5. An LED driving circuit comprising:
   a first DC-DC converter for adjusting a width of a switching pulse outputted from a first Pulse Width Modulation (PWM) controller to control on/off durations of a first switch, thereby providing a predetermined level of voltage to a red LED array having at least two red LEDs connected in series;
   a second DC-DC converter for adjusting a width of a switching pulse outputted from a second PWM controller to control on/off durations of a second switch, thereby providing a predetermined level of voltage to a blue LED array having at least two blue LEDs connected in series;
   a third DC-DC converter for adjusting a width of a switching pulse outputted from a third PWM controller to control on/off durations of a third switch, thereby providing a predetermined level of voltage to a green LED array having at least two green LEDs connected in series;
   a microcontroller for detecting a voltage from each of the red, blue, and green LED arrays, and if the detected voltage is greater than a predetermined voltage, generating an alarm signal indicating abnormality in a corresponding LED array;
   a digital-analogue converter for receiving the alarm signal and outputting a voltage of 0V for a corresponding DC-DC converter with the abnormality; and
   first to third analogue dimmers each connected to each of the first to third PWM controllers, the analogue dimmers adapted to generate a control signal that changes the 'on' duration of the switching pulse outputted from the PWM controller to 0 and provide the control signal to the connected PWM controllers if the voltage of 0V is received from the digital-analogue converter.

6. The DC-DC converter according to claim 5, wherein if the first to third DC-DC converters are buck DC-DC converters, the microcontroller detects voltages from cathodes of the red, blue and green LED arrays.

7. The DC-DC converter according to claim 5, wherein if the first to third DC-DC converters are boost DC-DC converters, the microcontroller detects voltages from anodes of the red, blue and green LED arrays.

* * * * *